Oct. 2, 1951     R. B. SAALFRANK     2,569,734
VALVE AND PUMP

Filed Dec. 15, 1948     7 Sheets-Sheet 1

INVENTOR
Royal Bartlett Saalfrank
BY
ATTORNEYS

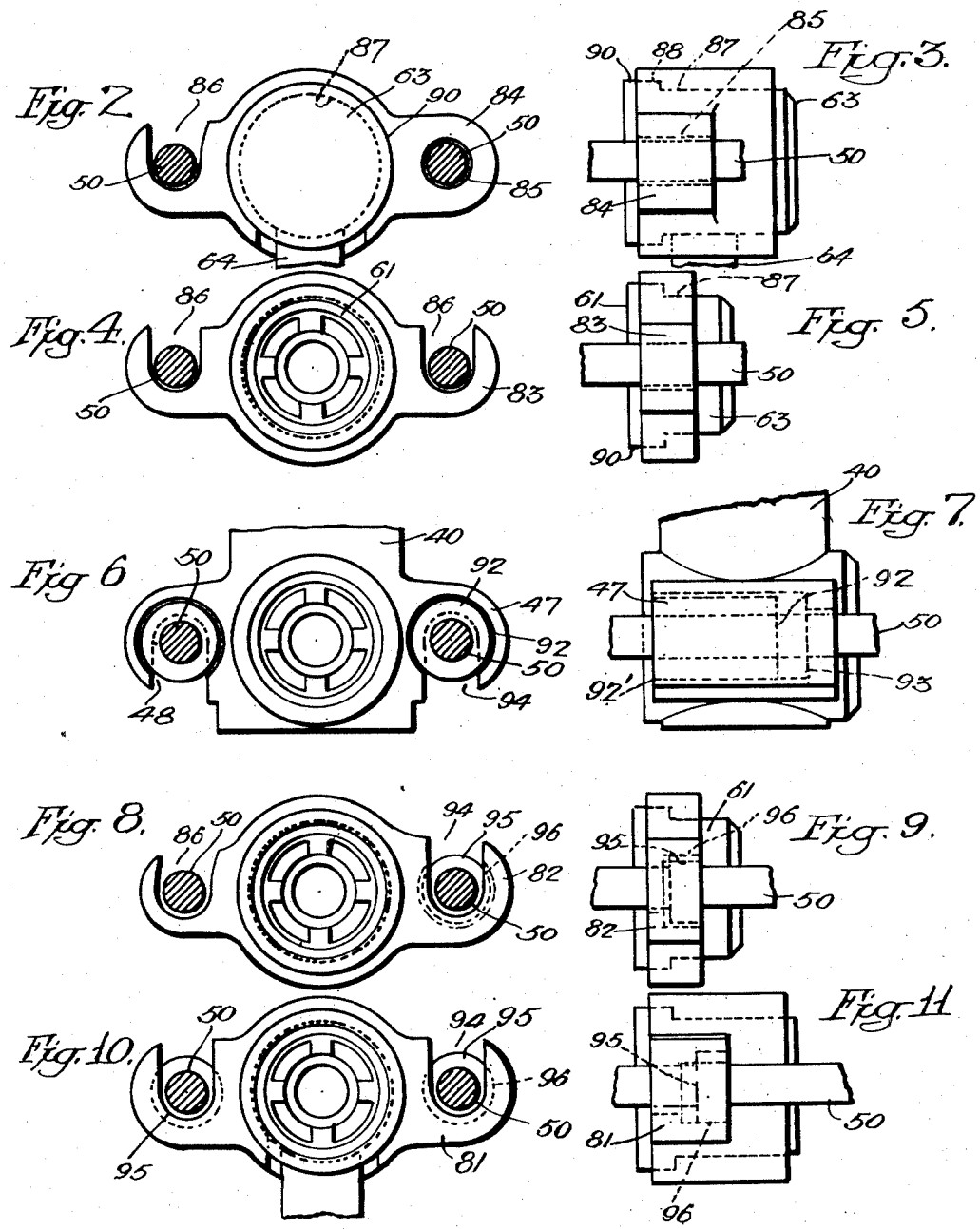

Oct. 2, 1951     R. B. SAALFRANK     2,569,734
VALVE AND PUMP
Filed Dec. 15, 1948     7 Sheets-Sheet 3
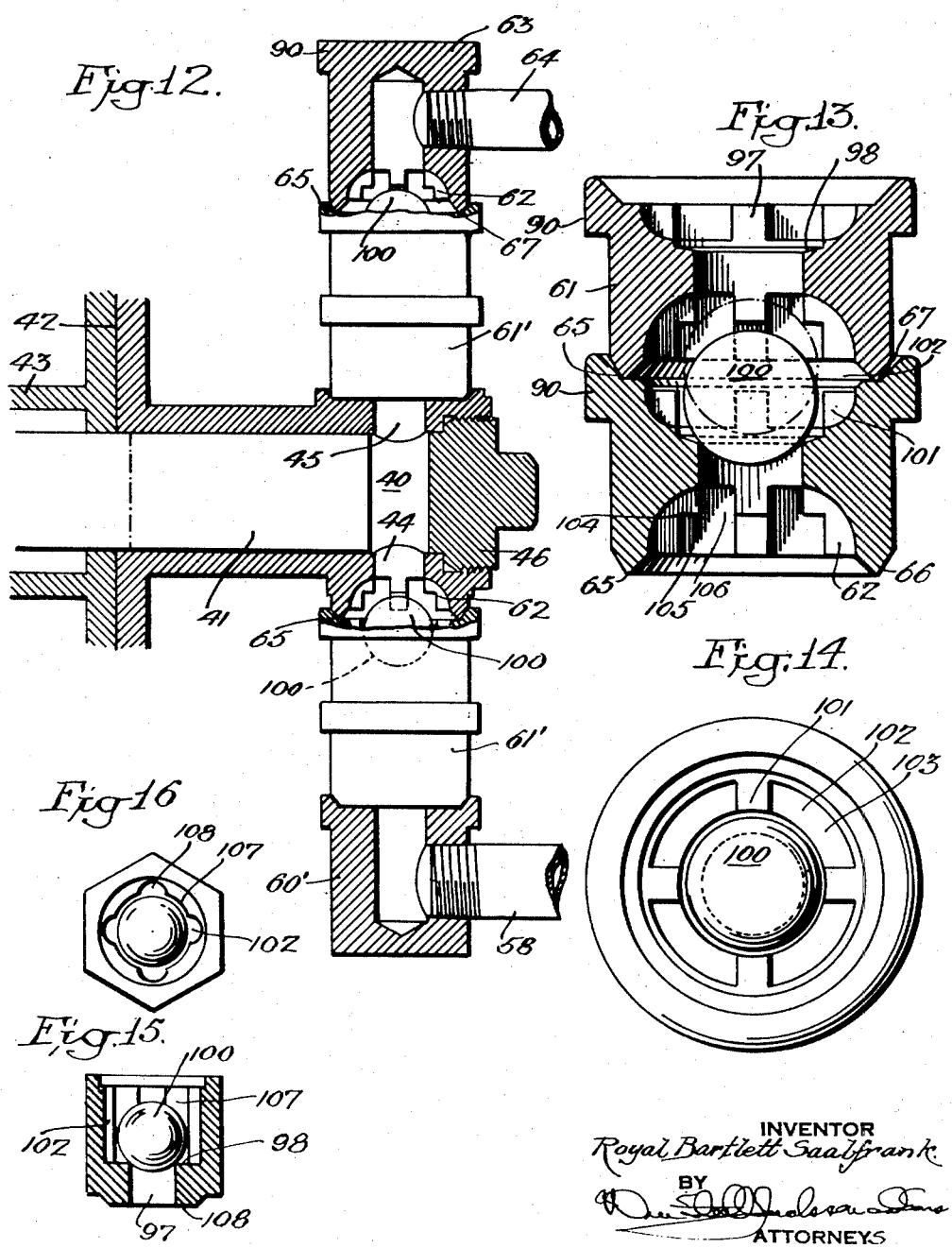
INVENTOR
Royal Bartlett Saalfrank
BY
ATTORNEYS

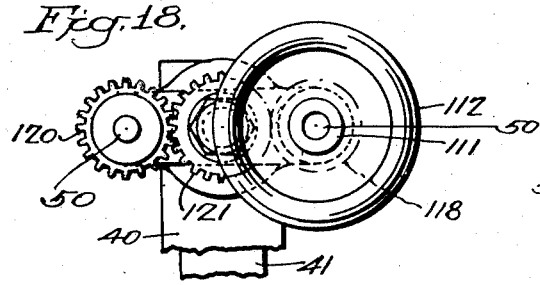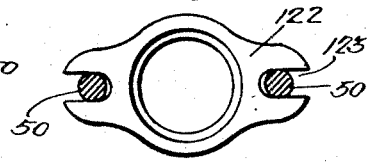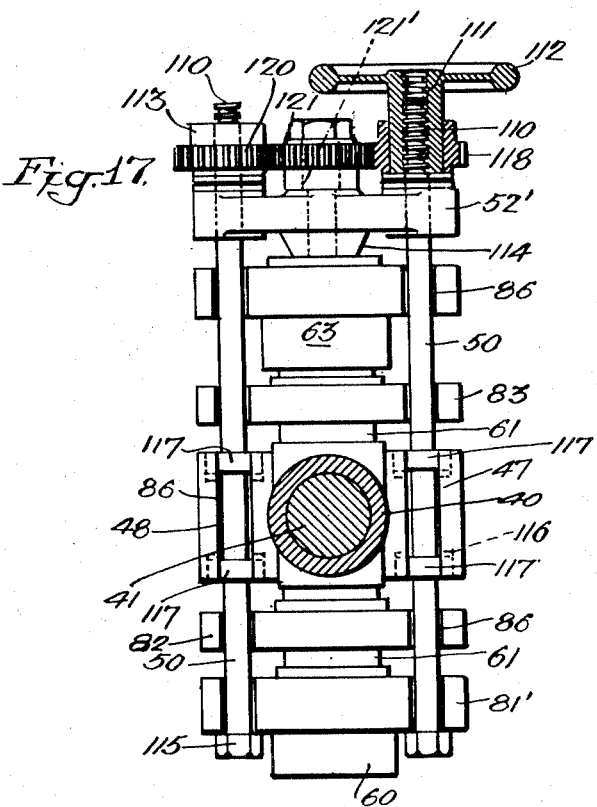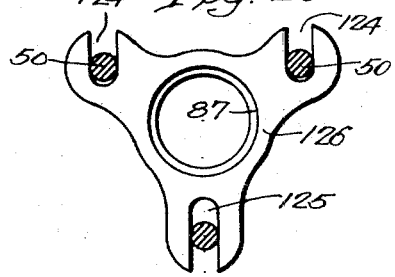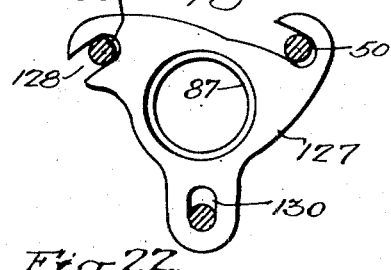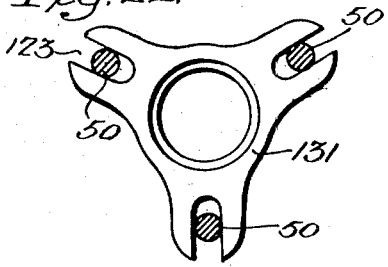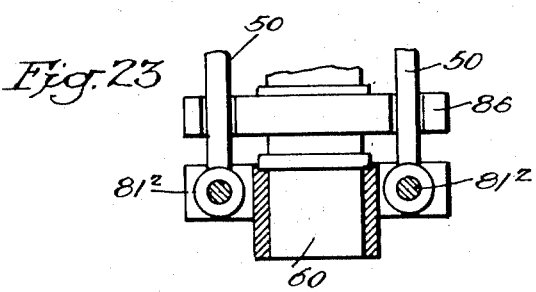

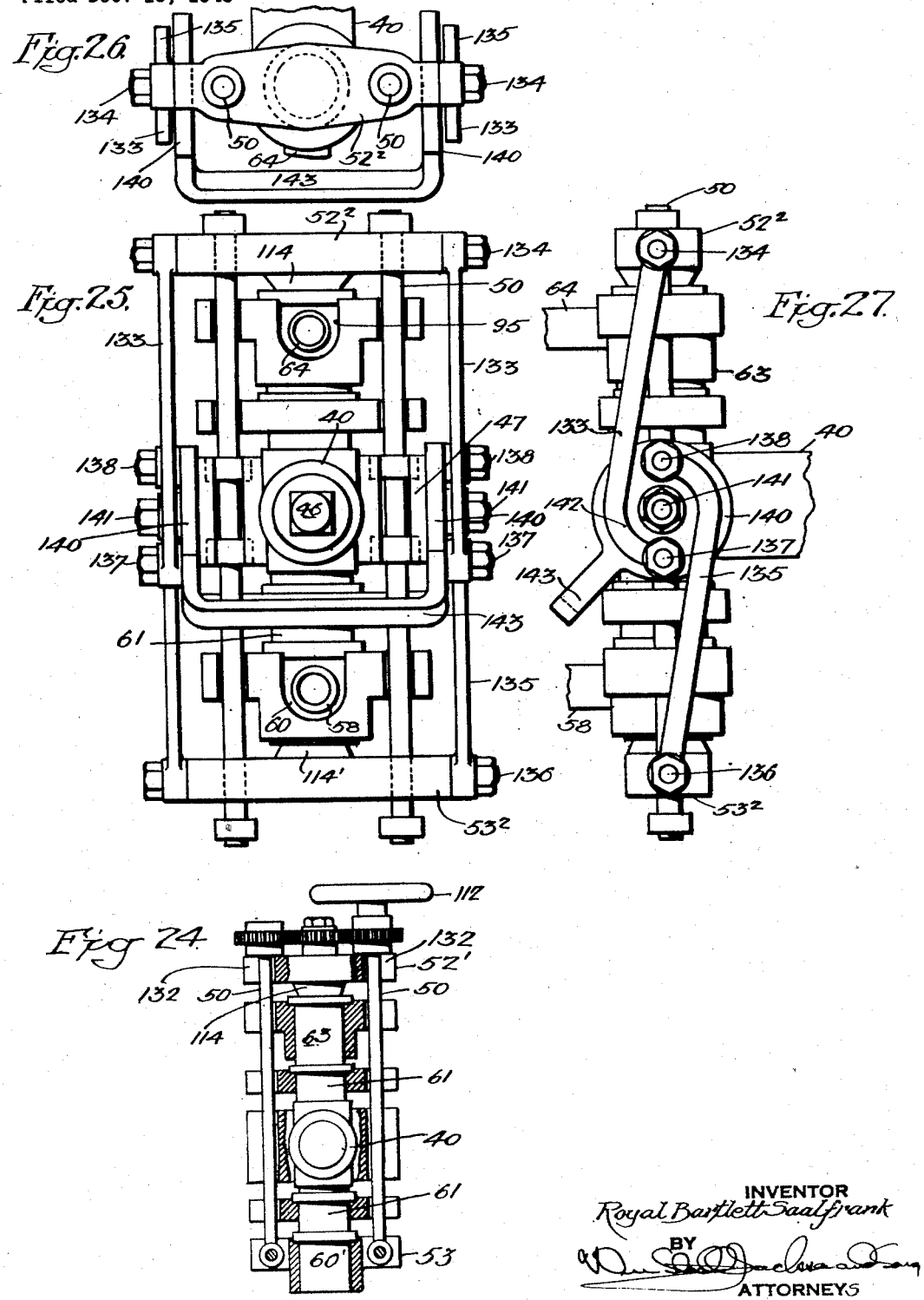

Oct. 2, 1951 R. B. SAALFRANK 2,569,734
VALVE AND PUMP
Filed Dec. 15, 1948 7 Sheets-Sheet 6
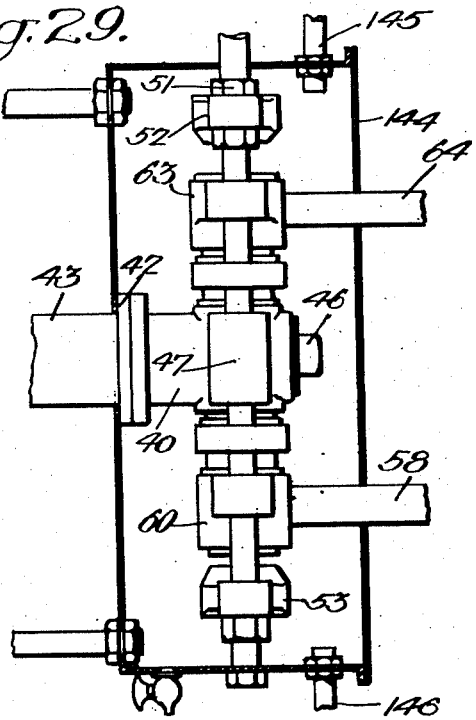
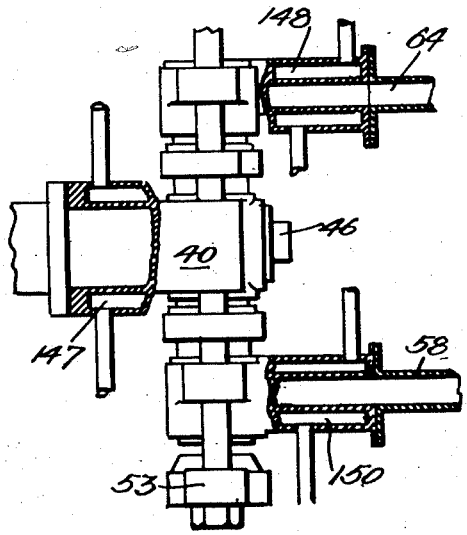
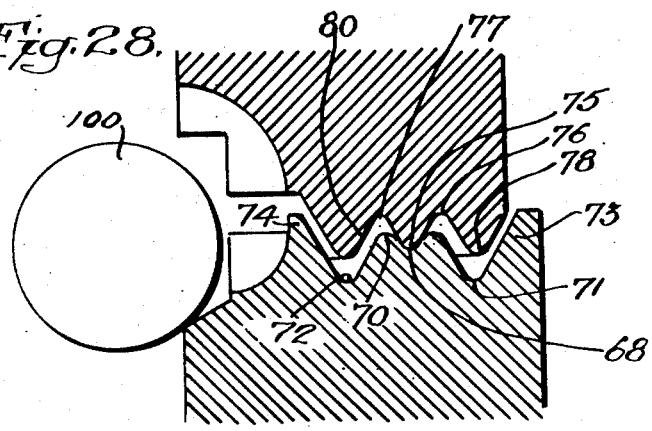
INVENTOR
Royal Bartlett Saalfrank.
BY
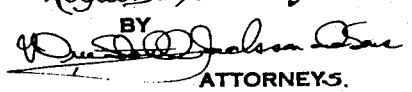
ATTORNEYS.

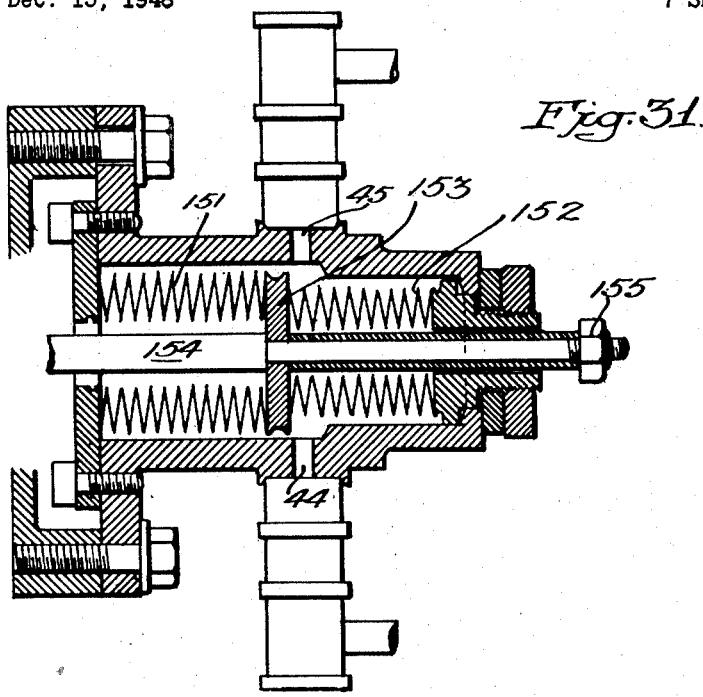
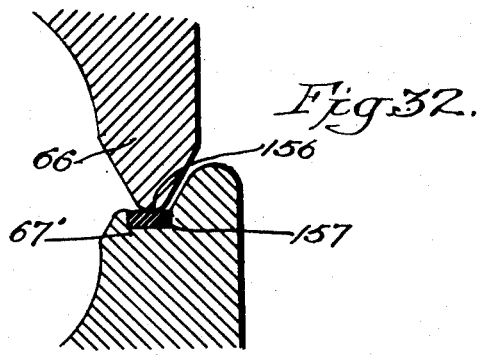

Patented Oct. 2, 1951

2,569,734

UNITED STATES PATENT OFFICE 2,569,734

VALVE AND PUMP

Royal Bartlett Saalfrank, Gulfport, Fla., assignor to Milton Roy Company, Philadelphia, Pa., a corporation of Pennsylvania Application December 15, 1948, Serial No. 65,356

6 Claims. (Cl. 103—228)

The present invention relates to valve assemblies and to valve and pump assemblies.

A purpose of the invention is to facilitate the inspection of any individual part of a valve assembly or of a valve and pump assembly without separately removing other parts.

A further purpose is to facilitate the cleaning, sterilization and subsequent inspection for cleanliness of individual valve and pump components.

A further purpose is to improve the construction of pumps intended for foods.

A further purpose is to mount the valve units of a pump or the like in wing supports which have quick-detachable connection to the tension rods of a clamp, and which can be moved out from the line of the clamp when it is desired to separate the parts.

A further purpose is to interconnect a stack of pump and valve units by pressure seals and maintain the joints tight by clamping pressure applied longitudinally of the stack.

A further purpose is to employ a collar on a tension rod to restrict the lateral movement of the wing support until it is moved longitudinally to disengage from the collar.

A further purpose is to arrange the individual valve units so that a given valve unit provides the seat for one ball and also the ball limiting walls for the ball of a valve below.

A further purpose is to extend lugs radially into the valve space to center the ball while permitting flow between the lugs.

A further purpose is to provide screws on the tension rods of the clamp and preferably to intergear nuts on the screws to facilitate tightening.

A further purpose is to provide a clamping plate pivoted transversely to the length of the stack, and to tighten by clamping levers preferably locking at or adjacent the axis or dead center.

A further purpose is to provide heating means for the stack or for one or more individual units of the stack.

Further purposes appear in the specification and in the claims.

In the drawings I have chosen to illustrate a few only of the numerous embodiments in which my invention may appear, selecting the forms shown from the standpoints of convenience in illustration, satisfactory operation and clear demonstration of the principles involved.

Figure 2 is a section of Figure 1 on the line 2—2.

Figure 3 is a fragmentary right end elevation of Figure 2.

Figure 4 is a section of Figure 1 on the line 4—4.

Figure 5 is a fragmentary right end elevation of Figure 4.

Figure 6 is a section of Figure 1 on the line 6—6.

Figure 7 is a fragmentary right end elevation of Figure 6.

Figure 8 is a section of Figure 1 on the line 8—8.

Figure 9 is a fragmentary right end elevation of Figure 8.

Figure 10 is a section of Figure 1 on the line 10—10.

Figure 11 is a fragmentary right end elevation of Figure 10.

Figure 12 is a side elevation, partly in central vertical section, showing a stack of valve and pump units, omitting the supports and clamp, and illustrating a variation of the form of Figure 1 in which the valve units adjoining the pump are separate therefrom.

Figure 13 is an enlarged detail vertical section of two adjoining valve units as shown in Figure 12.

Figure 14 is a top plan view of one of the valve units of Figure 13 showing the ball in place on the seat.

Figure 15 is a vertical axial section of a modified form of valve unit from that shown in Figures 13 and 14.

Figure 16 is a top plan view of the modified valve unit of Figure 15.

Figure 17 is a rear elevation, partly in vertical section, showing a modified stack of pump and valve units in accordance with the invention.

Figure 18 is a fragmentary top plan view of Figure 17.

Figure 1:
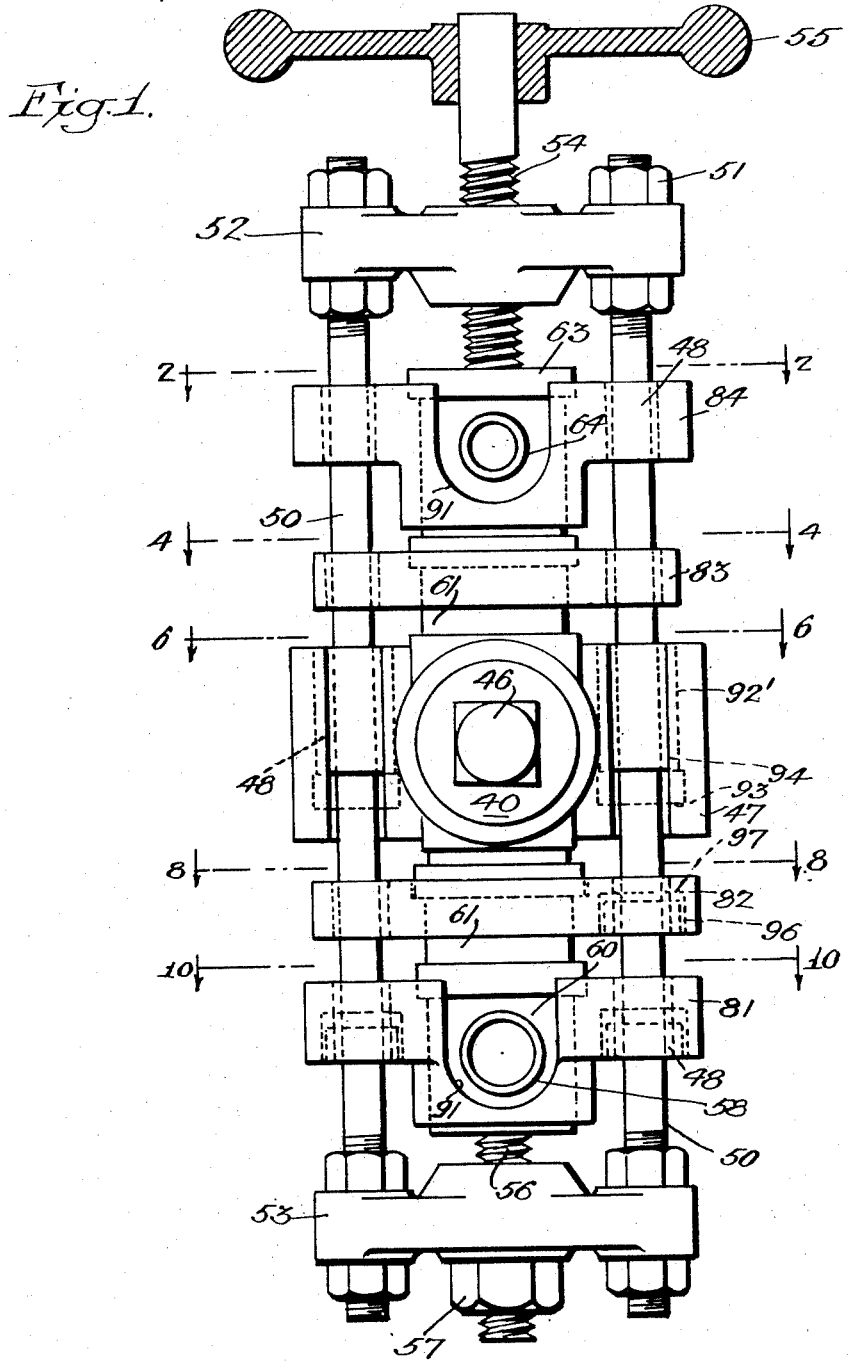
Figure 1 is an end elevation partly in axial section showing a stack including a pump and valve units assembled on a clamp.

Figures 19 to 22 inclusive are sectional views corresponding to Figure 2 illustrating in horizontal section variations in the wing support and tension rod construction.

Figure 23 is a view corresponding to the lower portion of Figure 17 illustrating a modified form of interconnection between the tension rods and the lower platen.

Figure 24 is a fragmentary axial section illustrating a modification in the connection between the tension rods and the upper platen, adapted to be used with an arrangement similar to Figure 23 for connecting the tension rods with the lower platen.

Figure 25 is a front elevation of a modified clamp construction.

Figure 26 is a top plan view of Figure 25.

Figure 27 is a right side elevation of Figure 25.

Figure 28 is an enlarged fragmentary axial section illustrating a modfied form of seal.

Figure 29 is a fragmentary side elevation, partly in central vertical section, showing steam jacketing of the pump and valve assembly.

Figure 30 is a view corresponding to Figure 29 illustrating a modified form of heating means.

Figure 31 is a fragmentary modification of the pump in central section axial of the pump cylinder.

Figure 32 is a fragmentary section of a modification in the seal, the section being axial of the stack of units.

Describing in illustration but not in limitation and referring to the drawings:

In the prior art considerable difficulty has been encountered in pumping foods such as milk, lard, edible oils and the like, due to the necessity of taking unusual precautions to protect against contamination of the valves, piping and connections. A somewhat similar problem exists in the handling of certain industrial liquids and chemicals, where either because of the corrosion of the fluid, or for other reasons, it is necessary to be able to disassemble the equipment readily in order to examine an individual part. In any of these cases, with conventional pumping equipment it has been tedious and expensive to disassemble the components for cleaning, inspection or other purposes. Also where the nature of the fluid pumped demands sterilization, boiling in cleaning liquid, or the like, it has in many cases been impractical to subject prior art pump and valve assemblies to such treatment.

The present invention is concerned particularly with valves and pumps especially suited to the food industry, the chemical industry and the handling of industrial fluids in which unusually thorough and rapid cleaning, sterilization or inspection are a factor. In accordance with the invention, it is possible to disassemble the fluid contacting parts of the device, or any individual fluid contacting part, in a minimum of time, and the fluid contacting parts are as far as possible independent of supporting parts, so that a minimum of bulk and weight of equipment is required to be sterilized or otherwise specially cleaned. All joints intimately associated with the fluid pumped have pressure seals and on release of the pressure an individual unit is available for removal. The supports of the individual units are in many cases quickly detachable from the stack of units to facilitate the separation and return of an individual unit.

Describing first the form of Figures 1 to 11 inclusive, and keeping in mind the section of Figure 12 (which illustrates many aspects of the form of Figures 1 to 11, although in one aspect it is a variation) and also the valve unit constructions of Figures 13 to 16 inclusive, it will be evident that the invention is applicable to any suitable pump having a cylinder 40, and a suitable moving wall, whether it be of bellows, piston or other character, and indicated conventionally by showing a piston 41 (Figures 12 and 17) which is reciprocated by any suitable drive mechanism not shown. The cylinder 40 is conveniently mounted as by flanges 42 (Figure 12) to a drive support 43 which may be the main housing of the pump.

The cylinder 40 has an inlet port 44 and a discharge port 45, both at one end. The end is conveniently closed by a plug 46 threaded into the cylinder, and permitting access to the interior where required.

The cylinder has at the sides wings 47 which make quick detachable connections 48 with tension rods 50 extending desirably vertically at either side of the end of the cylinder.

The tension rods in the form of Figure 1 are threaded at the ends and connected by nuts 51 with a top platen 52 and a bottom platen 53 both extending across the top and bottom of adjoining valve units, and forming with the tension rods a rectangular clamp frame. The top platen 52 has threaded therethrough, preferably at the center, a clamp screw 54 tightened by a handle 55. Located preferably at the center of the bottom platen is an anvil 56, preferably in the form of a screw, adjustable longitudinally and tightened in an adjusted position by a lock nut 57 working against the platen.

Below and above the pump ports 44 and 45 are located a plurality of check valves suitably two on the inlet and two on the outlet, all in series. In the form of Figure 1 the fluid enters through an inlet connection 58 in a header 60 which on its upper surface carries a valve check seat, and then flows upwardly through a check valve unit 61 which on its lower surface carries a check valve limiting surface as later described and on its upper surface carries a check valve seat. The unit 61 then detachably connects to the lower portion of the pump cylinder which carries a valve limiting surface 62 (Figure 12) and then passes through the inlet port 44 into the pump cylinder.

From the pump cylinder the fluid passes upwardly through the outlet port 45 and through the seat of a check valve, preferably of ball type, which seat is on the top of the cylinder, and then into a check valve unit 61 which has a bottom valve limiting surface 62 and a valve seat as later described, and then into a header 63 having a valve limiting surface 62 on its lower edge, and provided with a discharge connection 64.

Each of the units in sequence in the stack, the bottom header, the valve unit, the cylinder, the next valve unit and the top header, are interconnected by pressure seals 65, which may be as seen in Figure 13, consisting of a male member 66 of wedge cross section and a female member 67 cooperating therewith, the outer angular edges of the male and female members being preferably at a slight angle to one another. The male member preferably has a sharp forward edge which assures seating metal to metal. The apex cross-sectional angle of the male sealing edge will preferably be less than 90 degrees.

The sealing members have edges which are highly vulnerable to damage, and the form of Figure 28 is preferable to protect the sealing edges. In this form the female sealing edge 68 is in the form of a depression on an annular projection 70 which is surrounded on either side by two adjacent annular depressions 71 and 72 and then by two annular projections 73 and 74 each higher or more prominent than the female sealing edge, and serving to protect it.

The male element 75 is an annulus having a narrow cross-sectional apex engaging the female sealing surface 68, and on either side thereof are located annular grooves 76 and 77 surrounded by annular projections 78 and 80 which extend out beyond the sealing male surface 75. Thus when the parts are separated the projections 73 and 74 protect the female sealing surface 68 against impact with other surfaces, and the projections 78 and 80 protect the male sealing surface 75. When the parts are together the projections 78 and 80 on the male surface extend into the recesses 71 and 72 on the female surface.

The individual valve units and headers are removably supported in wing supports. The lower header 60 is supported in a wing support 81, the lower valve unit 61 is supported in a wing support 82, the upper valve unit 61 is supported in a wing support 83, and the top header 63 is supported in a wing support 84. Each of the wing supports surrounds or engages the tension rods and makes a quick opening joint 48 therewith.

To show various quick opening joint constructions, I have shown each unit in Figure 1 provided with a different kind of quick opening joint, but it will be understood that the same type can be used on all units.

Considering first the form of Figures 2 and 3, the wing support 84 has a longitudinal opening 85 which surrounds one of the tension rods 50, while at the other tension rod there is a side slot 86 in which the tension rod is engaged in closed position. The center of the wing support has an opening 87 which is counterbored to provide a shoulder 88 which receives a flange 90 on the top header 63. The wing support has a recess 91 into which the discharge connection 64 fits. All of the units are supported in their wing supports similarly to the unit just described.

Thus the header can be removed upwardly simply by disconnecting the remote end of the discharge connection 64, and swinging the wing support (once the clamp is loose), lifting only enough to clear the pressure sealing surfaces. The wing support in its swung or retraced position will act like a shelf, and the header can be detached therefrom and later replaced, the wing support with the header then being swung back into the position of Figures 1 and 2.

In the case of the valve unit 61, the wing support 83 is slotted longitudinally of the tension rods at 86 at the side at both tension rods, so that the wing support 83 and the valve unit 61 can be lifted out laterally whenever the clamp is released, and can be reinserted. Once the wing support is lifted out, the valve unit 61 which is engaged in the shouldered opening 87 of the wing support is readily removed in the direction of the axis of the valve unit.

Considering the attachment between the tension rods and the pump cylinder, in this case as shown in Figures 6 and 7, collars 92 are provided on the tension rods which engage in large circular slots 92' extending from the top of the wings down toward the bottom, but terminating at 93 (Figures 1 and 7) part way down so that the tension rods will remain seated in the slots. Narrower slots 94 pass clear through the wings at one side and are wide enough to permit movement of the tension rods to the side once the clamp is raised sufficiently to move the collars to a position above the wings 47. In the form of Figures 6 and 7 the combination of the collars with the collar slots and the narrow side slots is provided on both sides of the cylinder.

In Figures 8 and 9 the wing support 82 is shown provided with a collar 95 on one tension rod engaging in a collar slot 96 extending up from below and terminating at 97 part way up so that the wing support cannot drop on the tension rod below the collar. A narrow slot 94 sufficient to pass the tension rod extends clear through at one side, so that the wing support can be removed from the collar by raising it sufficiently to clear the collar, and then removing the wing support 82 to the side. The other side of the wing support 82 is provided with a side slot 86 extending clear through at one side. The valve unit 61 sockets in the wing support 82 as in Figure 4.

In Figures 10 and 11 the header 60 is socketed in the wing support 81 as in Figures 1 and 2. In this case the collars 95 and collar slots 96 with through slots 94 are provided on both tension rods so that the wing support can lift off laterally once it is raised sufficiently to clear the collars.

Thus it will be seen that in Figures 2 to 11 inclusive the wing supports can either swing or move off laterally, as the case may be, and in some cases can do either at the option of the user.

In the form of Figure 12, instead of providing a valve seat on the bottom header 60, and on the top of the cylinder, extra valve units 61' are introduced at the inlet and outlet, which are identical with the valve units 61 but merely supplement them, and have provisions for a pressure seal with the adjoining units. Accordingly in Figure 12 the stack consists from bottom to top of a bottom header, two inlet valve units, the pump cylinder, two outlet valve units and a top header, each joined by a pressure seal as already described to the adjoining units. The clamp will apply pressure to the two headers as already described.

The construction of the valve unit will preferably be as shown in Figures 13 and 14. Each valve unit 61 has a valve opening 97, surrounded on its upper side by a valve seat 98 which is engaged by a check valve ball 100. The ball is preferably closed by gravity rather than by a spring.

The ball during its unseating is centered by radial lugs 101 extending inwardly on either side of a ball chamber 102, and allowing slight freedom for the ball. Within the intervals between the lugs, spaces 103 are provided for flow of liquid. Each valve unit on its lower surface carries a limiting face 62 to prevent excessive unseating of the ball. The limiting face comprises preferably cooperating radial lugs 104 extending inwardly to a position adjoining but clearing from the ball, and upward limiting or roof lugs 105 which prevent excessive upward movement. Between the respective roof lugs are spaces 106 in which free upward flow of fluid can take place.

In some cases it is preferable to employ a valve unit of the character of Figures 15 and 16. In this case axially extending lugs 107 surround the ball in the valve chamber 102, while intermediate grooves 108 permit flow upwardly when the ball is unseated. The limiting of the upward motion of the ball in this case is provided by the bottom 108 of the unit which acts on the ball below it.

In some cases it is preferable to apply the pressure on the stack of units against the ends of the tension rods themselves, rather than between the platens. A device of this kind is shown in Figures 17 and 18, in which case the screw 54 is eliminated and the tension rods 50 carry adjusting screws 110 at the ends which are respectively engaged by a nut 111 having a handle 112 and by a nut 113. Both nuts act downwardly on the upper platen 52', which has an anvil 114 engaging the top of the stack. In this form the bottom platen may be conveniently omitted, and a wing support 81' for the bottom header engages the lower enlarged ends 115 of the tension rods and acts as a platen. All of the wing supports in this form are of the double side slot variety shown in Figure 4 except for the wings on the cylinder which are provided with collar recesses 116 at the top and bottom containing collars 117 in addition to side slots 86 for the rods. To remove the tension rods from the pump cylinder wings the collars must be removed, as by loosening their set screws (not shown). It is convenient in many cases to tighten both nuts from the handle 112, and this is accomplished by providing gear teeth 118 on nut 110 and gear teeth 120 on nut 113, with an idler gear 121 interconnecting the two and turning on a shaft 121' secured in the top platen 52'. The direction of the threading on the tension rods should be arranged so that both nuts will tighten when the handle 112 is turned in the same direction.

In some cases it may be desirable to employ different tension rod and slot interconnections as shown in Figures 19 to 22 inclusive. Thus in Figure 19 a wing support 122 is provided with diverging slots 123 through which the tension rods pass, the wing support being removable only when the tension rods are separated in one of the forms in which this is possible as later explained. Similarly three tension rods may be used as shown in Figures 20 to 22 inclusive. In Figure 20 laterally outwardly opening slots 124 closely conforming to the tension rods are provided at two of the rods, and an elongated slot 125 at the other rod, which may permit motion to remove the wing support 126 without displacing the rods or may require separation of the rods as later explained. In Figure 21 a wing support 127 is provided with arcuately open slots 128 at two of the tension rods and a radial closed slot 130 at the other rod, the intention being to rotate the wing support for removal from some of the rods, pivoting about the other rod. In the form of Figure 22 diverging radial slots 123 are provided on all rods of the wing support 131, it being necessary to separate the rods as later explained to remove the wing support.

The tension rods may be pivotally mounted on the bottom platen or header wing support 81² as shown in Figure 23, so that the rods can be separated by slipping them out of slots 132 in the top platen 52' as shown in Figure 24, once the clamps are loosened. In order to separate the rods in the form of Figure 23, the wing support 86 for the valve unit must be slipped off laterally. However, in the case of a form such as that of Figures 19, 20 or 22, the tension rods must swing outwardly in the slots on the wing supports to remove the wing supports.

The form of Figures 25 to 27 inclusive shows a quick acting clamp applied to the stack of units. In this form the tension rods function primarily as guides, being secured to the wings on the cylinder after the manner of Figure 17. Top and bottom platens 52² and 53² move longitudinally together and apart with respect to the tension rods, under the action of links 133 pivotally connected at 134 to the opposite ends of the platen 52² and links 135 pivotally connected at 136 to the opposite ends of the platen 53². The adjoining ends of the links overlap one another in clamping position and are pivotally connected respectively at 137 and 138 to the clamping plates 140 pivoting at 141 transversely to the axis of the stack on the wings of the pump cylinder. The links are hooked at 142 to pass to the opposite sides of the pivots 141 in locked position so that they will lock close to the dead center or neutral axial position and remain self-locking. The clamping plates are preferably integral with and cross connected by a yoke handle 143 which permits operation of both in unison. The platens carry anvils 114 and 114' engaging the respective ends of the stack of units.

The quick locking of the device in Figures 25 to 27 is accomplished by simply rocking the handle back and forth.

In some cases it is desirable to provide heat or cooling for the valves, especially when handling media which tend to solidify, or to vaporize. In Figure 29 I illustrate a steam jacket 144 surrounding the whole assembly and having inlet at 145 and outlet at 146. The parts can be individually jacketed or otherwise heated, as shown in Figure 30, where a steam or other jacket is provided at 147 on the cylinder and at 148 and 150 on the valve units. It will be understood of course that the jacketing can be used for refrigerant instead of steam or other heating medium.

Figure 31 shows a modification in the pump, employing differential bellows 151 and 152 of slightly different sizes, interconnected at 153 and operated by a reciprocating rod 154 from the drive. The stroke is limited at 155. The inlet and outlet ports 44 and 45 are conveniently located near the middle of the cylinder, and connect by pressure seals to inlet and outlet units above and below as in the other forms, all held together by a clamp. The differential bellows pump is described and claimed in my copending application, Serial No. 53,953, filed October 11, 1948, for Bellows Pump.

In some cases as shown in Figure 32, one of the pressure sealing surfaces 66 and 67' may be provided with a gasket 156 in an annular recess 157.

The term "cylinder," as used in the specification and claims to describe a part of a pump, is defined as not limited to those pump barrels which are truly geometrically cylindrical, but including other shapes as well.

In operation of any of the forms, it will be understood that the pump and valve units will be assembled and clamped tight by clamping the appropriate screw or other mechanism. When it is desired to inspect or clean the equipment, the source of fluid is disconnected, and the pump stopped, after which the clamp is released sufficiently to allow the seals between the individual units to move axially of the stack sufficiently to clear. The wing supports can then swing or move laterally depending on their design, with or without axial movement first to clear the collars. An individual shelf-like wing support can thus be taken out with its corresponding unit, or the entire equipment can be disassembled, as preferred. Once the wing support is separated, the corresponding valve unit, header or the like can be taken out for inspection, cleaning or the like.

In assembly the reverse process will be used, finally clamping the stack of units firmly together after the seals have been properly aligned.

During the period when the structure is disassembled it will be comparatively safe to use and handle, especially if the protected type of seal shown in Figure 28 be employed.

In view of my invention and disclosure variations and specifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In a pump and valve assembly, walls forming a pump cylinder having inlet and outlet ports opposite to one another, check valve units having check valves opening in the direction of flow arranged respectively at the inlet and outlet ports, an inlet header unit arranged at the inlet side of the first inlet valve unit, an outlet header unit arranged at the outlet side of the last outlet valve unit, there being pressure seals among the succession of the inlet header, inlet valve unit, cylinder, outlet valve unit and outlet header, wing supports for the valve units and headers, and a clamp extending on opposite sides of both headers and bringing pressure on the headers toward one another to compress the seals, the clamp having tension rods, and there being quick opening connections between the tension rods and the wing supports.

2. In a valve assembly, a plurality of valve units adjoining one another, there being a pressure seal between the respective valve units, a wing support for one of the valve units, and a clamp extending on opposite sides of the valve units to bring pressure on the same and including tension rods, the tension rods passing through the wing supports and one of the wing supports being laterally slotted at both tension rods to move to the side with respect to the tension rods.

3. In a valve, a plurality of valve units having check valves adapted to open in the direction of flow, there being pressure seals between the respective valve units, a wing support for one of the valve units, a clamp surrounding the valve units and adapted to bring longitudinal pressure to close the pressure seal, the clamp having tension rods which pass through the wing supports, the wing supports being slotted and having a slot enlargement which is partially closed to the side an open endwise, and a collar normally seated in the slot enlargement and adapted to hold the wing support against lateral movement until the wing support moves longitudinally with respect to the tension rods.

4. In a valve and pump assembly, top and bottom platens, tension rods parallel with one another interconnecting the platens, an anvil on the bottom platen, a screw on the top platen extending longitudinally with respect to the tension rods, a pump cylinder interconnected with the tension rods and having vertically directed inlet and outlet ports between the tension rods, a lower valve unit below the cylinder having a pressure seal connection to it, a wing support for the lower valve unit making quick opening connection with the tension rods, a lower header unit below the lower valve unit making a pressure seal with the lower valve unit and resting on the anvil, a support for the lower header making quick opening connection with the tension rods, an upper valve unit above the cylinder making pressure connection with it, a support for the upper valve unit having quick opening connection with the tension rods, a header above the upper valve unit and adapted to receive pressure from the screw and a support for the upper header making quick opening connection with the tension rods.

5. In a valve and pump assembly, a pump cylinder, check valves on either side of the cylinder opening in the direction of flow, there being pressure seals between the individual valve units and the cylinder, platens at either end of the sequence, tension rods extending through the platens and having screws thereon and nuts on the screws for tightening the tension rods, intergearing between the nuts and a device on one of the nuts for turning the nuts.

6. In a valve and pump assembly, a pump cylinder, a stack of valve units on opposite sides of the cylinder having pressure seals to one another and to the cylinder, wing supports on the valve units, tension rods extending longitudinally of the stack and making quick detachable connection to the wing supports, platens on either end of the stack connecting to the tension rods, clamp plates transversely pivoted on either side of the stack intermediate between the platens, levers pivotally interconnecting the platens with the clamp plates at each end of the platens and an operating handle interconnecting the opposite clamp plates.

ROYAL BARTLETT SAALFRANK.

REFERENCES CITED

The following references are of record in the file of this patent:

UNITED STATES PATENTS

| Number | Name | Date |
| --- | --- | --- |
| 53,396 | Burkinbine | Mar. 27, 1866 |
| 181,168 | Hill et al. | Aug. 15, 1876 |
| 412,982 | Schenck | Oct. 15, 1889 |
| 720,100 | Bashlin | Feb. 10, 1903 |
| 1,001,246 | Budlong | Aug. 22, 1911 |
| 1,022,556 | Johnson et al. | Apr. 9, 1912 |
| 1,208,259 | Winton | Dec. 12, 1916 |
| 1,468,187 | Werbeck | Sept. 18, 1923 |
| 1,715,854 | McKenzie-Martyn | June 4, 1929 |
| 2,034,786 | Wilcox | Mar. 24, 1936 |
| 2,195,335 | Loginov | Mar. 26, 1940 |
| 2,355,862 | Harper | Aug. 15, 1944 |

FOREIGN PATENTS

| Number | Country | Date |
| --- | --- | --- |
| 401,765 | Great Britain | Nov. 23, 1933 |